United States Patent [19]
Zuercher et al.

[11] Patent Number: 6,137,418
[45] Date of Patent: Oct. 24, 2000

[54] SINGLE CHANNEL APPARATUS FOR ON-LINE MONITORING OF THREE-PHASE AC MOTOR STATOR ELECTRICAL FAULTS

[75] Inventors: Joseph Charles Zuercher, Brookfield, Wis.; Daniel Harley Wagner, Gurnee, Ill.; David Tallman, Cleveland, Tenn.

[73] Assignee: Eaton Corporation, Cleveland, Ohio

[21] Appl. No.: 09/035,592

[22] Filed: Mar. 5, 1998

[51] Int. Cl.[7] .................................................. G08B 21/00
[52] U.S. Cl. ......................... 340/648; 340/664; 340/635; 324/522; 361/31; 318/650
[58] Field of Search ................................... 340/648, 646, 340/635, 658, 660, 664; 324/522; 361/31; 318/650

[56] References Cited

U.S. PATENT DOCUMENTS 3,919,600  11/1975  Sons ......................................... 340/648

OTHER PUBLICATIONS

*On–Line Discharge Measurements On Motors*, K.G. Burnley, The 6th BEAMA International Electrical Insulation Conference, pp. 345–349, May 1990.

*Primary Examiner*—Julie Lieu
*Attorney, Agent, or Firm*—Martin J. Moran

[57] ABSTRACT

An on-line monitor for electrical faults in the stator of an ac motor has a single di/dt current transformer or three separate di/dt current transformers coupled to the three phase conductors of the ac supply. The windings of the transformer, or transformers, are selected to generate a single sensed signal containing a linear combination of components of current in the three phase conductors weighted relatively so that algebraic differences between components from any two phase conductors is non-zero, such as preferably 2A+B−C or 3A+2B+C. The single sensed current signal is bandpass filtered to generate a pulse signal which is applied to an analyzer. The analyzer, preferably implemented by a microcontroller, generates an output based upon a combination of the amplitude and frequency of occurrence of the current pulse signal including a time attenuated accumulation of the pulses. A similar pulse signal is generated from a single sensed voltage signal and compared to the pulse signal generated from the current sensor to verify that the detected events originate in the motor and not from upstream in the ac supply. The monitor is coupled to the phase conductors between the local disconnect switch and the motor, and preferably, is mounted in the disconnect housing.

20 Claims, 4 Drawing Sheets

SINGLE CHANNEL APPARATUS FOR ON-LINE MONITORING OF THREE-PHASE AC MOTOR STATOR ELECTRICAL FAULTS

BACKGROUND OF THE INVENTION

1. Field of the Invention

This invention relates to apparatus for on-line monitoring of three-phase ac motors for stator electrical faults, and in particular, to such apparatus which uses a single channel to monitor all three phases, yet detects all series and parallel electrical faults related to the stator.

2. Background Information

Induction motor faults can be conveniently divided into stator, rotor, bearing, and other failures. A fault may progress from one type to another, for instance, rotor to bearing. A common physical process is stator insulation breakdown, which greatly contributes to various stator winding failures: winding/winding, phase/phase, phase/floating neutral, and phase/ground. In addition, series faults can result from a variety of causes: loose connections, breaks in fatigued wires, and the like. Vibration and contamination, often present in industrial motor environments, contribute to and exacerbate the effects of arcing, either in series or parallel. High temperatures from overloads or the environment accelerate insulation wear and breakdown.

Common solutions to motor diagnostics involve off-line measurement using testers, or on-line techniques using high resolution Fourier analysis at low frequencies of phenomena other than arcing. Moreover, faults which develop on continuously running motors which cannot conveniently be taken out of service might not be detected before a catastrophic failure. Another problem is the percentage of motors, albeit small, in which the windings are actually stressed during the testing.

A proposal has been made for on-line monitoring of ac motors for discharge activity. "On-Line Discharge Measurements on Motors", K. G. Barnley, The 6th BEAMA International Electrical Insulation Conference, May 1990. Sensed currents generated by current transducers placed around each of the supply cables are analyzed in separate signal processing channels. A digital readout of the magnitude and repetition rate of pulses generated by discharge activity is presented. While it is theorized that similar measurements could be made on motors with a single three-phase supply cable, no suggestion is provided as to how this could be accomplished. A single transducer would only be able to detect ground faults.

It is known to monitor the current in the neutral conductor of a wye connected three-phase motor, as imbalances in the phase currents are reflected in the neutral. However, most wye connected motors are not used in supply systems with a neutral conductor so that the neutral connection floats.

There is a need therefore for improved apparatus for on-line monitoring of stator electrical faults in three-phase ac motors.

In particular there is a need for such improved apparatus which is simple and moderate in cost.

More specifically, there is a need for such improved apparatus which can detect all types of stator electrical faults with single channel processing, without, for example, resorting to the more complex strategy of multiplexing.

There is an additional need for such apparatus which can be used with delta connected motors and wye connected motors with a floating neutral.

SUMMARY OF THE INVENTION

These needs and others are satisfied by the invention which is directed to on-line monitoring of a three-phase ac motor using a single processing channel. More particularly, the apparatus has current sensing means coupled to each of the three phase conductors supplying the ac motor for generating a single sensed current signal containing components representative of currents in each of the three phase conductors combined to provide indications of all stator electrical fault events. This is achieved by weighting the components representative of currents in each of the three phase conductors relatively so that algebraic differences between components from any two phase conductors are non-zero. The apparatus further includes processing means generating an output indicative of stator electrical faults from the sensed current signal. By all stator electrical faults it is meant all types of electrical faults which can occur in a stator including: phase to phase, phase to ground, and winding to winding faults. It also includes faults at the connections to the stator such as phase conductor connections.

More particularly, the current sensing means comprises transformer means having winding means which generate the single sensed current signal as a linear combination of the components representative of the currents in each of the three-phase conductors selected to provide the indications of all stator electrical faults. This is accomplished by selecting a linear combination of the current components so that none of the current phenomenon produced by any type of stator electrical fault is cancelled due to the transducer configuration. Specifically, the components are weighted relatively so that the algebraic differences between components from any two phase conductors is non-zero. In the exemplary embodiment of the invention the linear combination of the components have relative values of +2, +1 and −1. An example of an alternative combination is +3, +2 and +1.

The transformer means can be a single transformer with three primary windings and a single secondary winding or three separate current transformers with the secondary windings connected in series. In the case of the single transformer, the three primary windings are each connected to a different one of the three phase conductors with a respective number of turns being selected to provide the selected linear combination of current components. Thus, in the exemplary embodiment, one primary winding has two turns, a second primary winding has one turn, and the third primary winding has one turn in the opposite direction.

Where three separate current transformers are used, the primary of each of the separate transformers is connected to a different one of the phase conductors and the primary to secondary turns ratios of the three transformers are selected to provide the selected linear combination of current components. Also in this case, instead of winding one primary winding in the opposite direction from the others, the secondary winding can be connected in reverse to produce the same result.

The transformers are di/dt transformers which generate an output representing the rate of change of the current in the primary. The processing means includes a pulse discriminator which forms pulses in response to the step change in current caused by the stator electrical fault. The processor also includes an analyzer, preferably in the form of a microcontroller, which responds to the amplitude of the pulses and their frequency of occurrence. Preferably, in addition to providing an indication each time a pulse is generated in response to a stator electrical fault event, the analyzer maintains a time attenuated accumulation of the pulses and generates an output indicating a higher level of activity when the time attenuated accumulation reaches a predetermined value. The indication of a fault is retained until it is timed out (minor indication), or acknowledged and reset. Preferably, indications of any level of activity can be reset. The number of resets is maintained for later review.

Discharges in current during series or parallel faults precede a hard short or open in a motor stator. By detecting these precursor events, the monitor of the invention provides early warning of a hard fault allowing the motor to be replaced before failure or taken off-line for more extensive testing.

DESCRIPTION OF THE PREFERRED EMBODIMENTS

Figure 1:
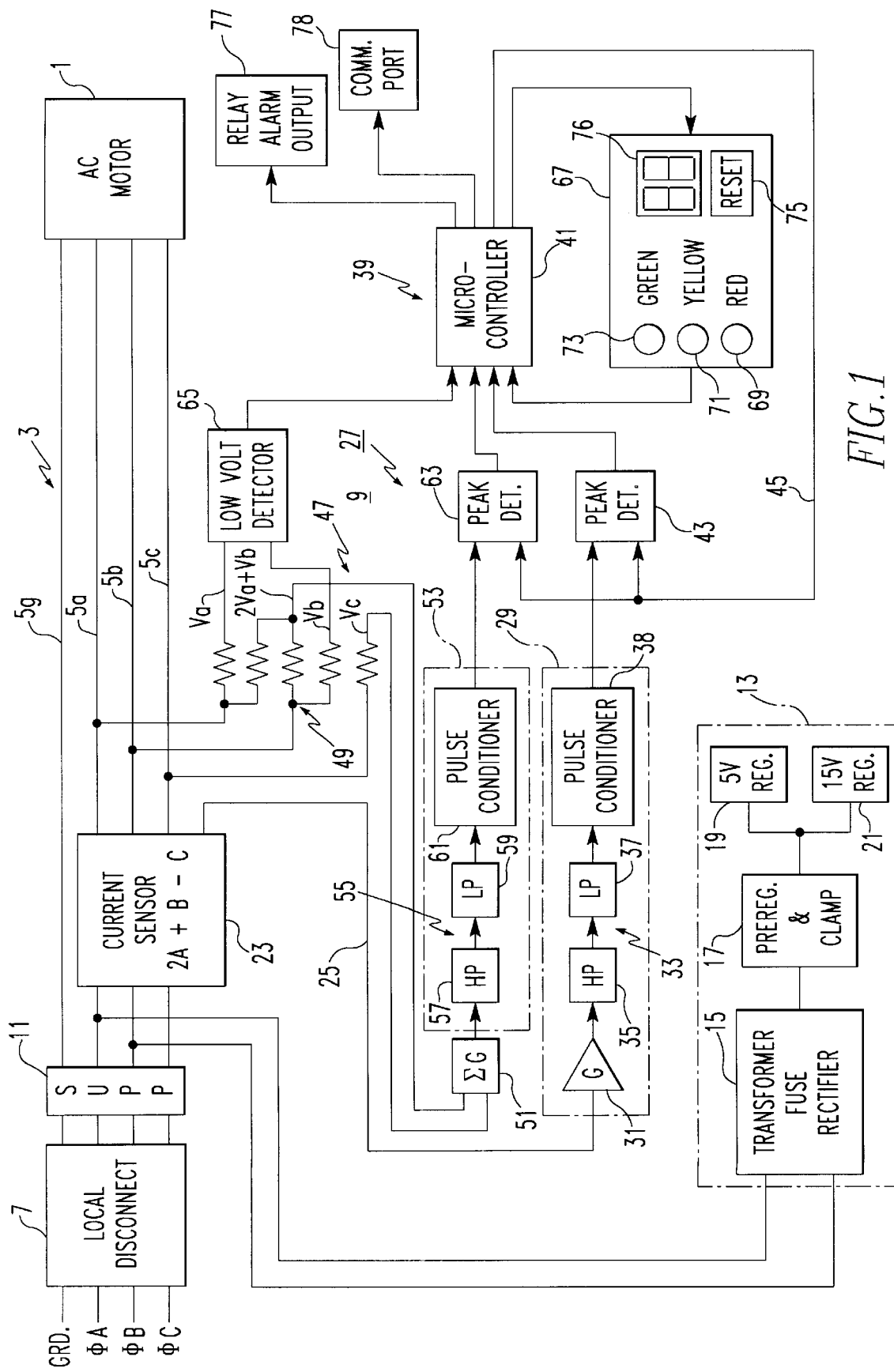
FIG. 1 is a schematic circuit diagram in block form of apparatus in accordance with the invention.

Referring to FIG. 1, the ac motor 1 to be monitored is a three-phase induction motor. The motor 1 is energized by a three-phase electric power system 3 having three phase conductors 5a, 5b and 5c and a ground conductor 5g. As required, a disconnect switch 7 is provided near the motor 1 for deenergizing it. Apparatus in the form of a monitor 9 is provided between the motor 1 and the disconnect 7 for on-line monitoring of the motor. Preferably, the monitor 9 can be mounted in a common housing with the disconnect 7. The monitor 9 which is powered from the ac electrical system 3 has a transient suppressor 11 connected across the conductors 5. Transient suppression can be provided, for instance, by a star connected metal oxide varistors (MOVs) as is well known. Single-phase power for the monitor 9 is drawn from the ac electrical system 3 by a power supply 13 which includes a step down transformer, fuse and rectifier bridge 15, a preregulator and clamp 17 which clamps the voltage at 27 volts dc, and a five volt dc regulator 19 and a 15 volt dc regulator 21.

The monitor 9 detects stator electrical fault events in the motor 1 by looking for the disturbances in the phase currents caused by these events. Typically, these events are arcs which produce sharp step increase in currents usually accompanied by high frequency noise. The current disturbances are detected by a current sensor 23. As will be described in more detail, this current sensor is either a single transformer with multiple primary windings or three separate current transformers. In accordance with the invention a single sensed current signal is generated which contains components derived from the current in each of the conductors 5a–5c. These components must be selected to avoid degenerate cases. For instance, if the currents are simply added, such as by a single current transformer with an equal number of primary windings for each phase current and a common secondary current, only faults involving ground will be detected because the increased currents caused by line to line faults will cancel each other as is well known. This is the most degenerate case. Another degenerate case occurs if two of the currents are added and one is subtracted, such as by reversing the direction of the primary winding for that phase. However, in this case a totally symmetric fault between the two phases whose currents are added will result in the desired signal also being attenuated.

In accordance with the invention, transformer windings are arranged to provide a selected linear combination of current components in the sensed current signal which will provide indications of all stator electrical fault events. This is accomplished by weighting the components representative of currents in each of the three phase conductors relatively so that algebraic differences between components from any two phase conductors are non-zero. In the exemplary embodiment of the invention, the linear combination of current components have relative values of +2, +1 and –1. Thus in the exemplary embodiment the current sensor 23 generates a single sensed current signal 25 which is 2A+B–C. Other relative values of the phase components of the sensed current signal can be used. For example, relative values of +3, +2 and +1, though sometimes less convenient to execute, provide more phase to phase uniformity (2:1 rather than 3:1). The general rule is that the algebraic difference between any two never equal zero to avoid masking of any fault involving two of the three phases.

As will be described, the current sensor 23 can be either a single current transformer or three separate current transformers. All of these current transformers are iron-core toroidal current transformers operating in a high impedance output or di/dt mode up to about 100 KHz. Since the stator electrical faults are arcs which are normally a high frequency event, such current transformers provide a high pass function through differentiation and thereby provide gain for a typical arc signal (more than 15 KHz in an induction motor) that is over 100 times that of a 60 Hz line signal.

The single sensed current signal 25 is applied to processing circuitry 27. Included in this processing circuitry 27 is a pulse discriminator 29. The pulse discriminator includes an op amp 31 providing gain, a bandpass filter 33 and a pulse conditioner 38. The bandpass filter 33 is made up of a 10 KHz high pass filter 35 followed by a 50 KHz low pass filter 37. The bandpass filter 33 outputs a bipolar pulse signal. The pulse conditioner 39 converts these pulses to unipolar pulse signals, provides gain, and clamps the maximum amplitude of the pulses. Thus, the pulse discriminator 29 generates a unipolar signal with a pulse for each stator electrical fault event, proportional to event size.

The processing circuitry 27 also includes an analyzer 39. In the preferred embodiment of the invention, the analyzer 39 includes a microcontroller for digital processing of the pulse signal generated by the current pulse discriminator 29. However, it will be appreciated that an analog or hybrid analyzer could also be used to perform the functions to be described. A peak detector 43 serves as a sample and hold circuit for inputting the current pulse signal from the current pulse discriminator 29 into the microcontroller 41. This peak detector 43 is resettable by the microcontroller through the lead 45. In the exemplary embodiment of the invention, the microcontroller 41 reads the peak detector 43 at 2.5 KHz.

The monitor 9 also senses the voltages on the three phase conductors 5a–5c to determine whether the disturbances detected in the current are originating in the motor 1 or upstream in the electrical system. Accordingly, a voltage sensor 47 includes a resistor network 49, which by appropriate selection of resistor values produces a signal proportional to 2Va+Vb in addition to voltages Va, Vb and Vc proportional to the phase voltages. The signal Vc is subtracted from the signal 2Va+Vb in a summing amplifier 51 to produce a single voltage signal which is a linear combination of components of the three phase conductor voltages. This linear combination is the same combination as used for generating the single sensed current signal. The processing circuitry 27 also includes a sensed voltage pulse discriminator 53 which includes a similar bandpass filter 55 made up of a 10 KHz highpass filter 57 followed by a 50 KHz lowpass filter 59. The bipolar pulse signal output by the bandpass filter 55 is converted to a unipolar pulse signal, amplified, and clamped by the pulse conditioner circuit 61. A second resettable peak detector 63 inputs the sensed voltage pulse signal into the microcontroller 41.

A low voltage detector 65 senses the voltage between phase A and phase B for input to the microcontroller 41. As will be seen, if the voltage is below a selected threshold, the microcontroller suspends fault monitoring. As mentioned, the voltage signal from voltage discriminator 53 is used to determine whether the pulses generated in the pulse signal are originating from the motor or from upstream in the electrical system.

The analyzer 39 further includes outputs in the form of a display board 67. On this display board are red, yellow and green lights 69, 71, and 73, respectively, a reset button 75 and a two-digit display 76. A relay alarm output 77 can also be provided. If desired, a communications port 78 can be provided to control or observe operation of the monitor remotely.

Figure 2:
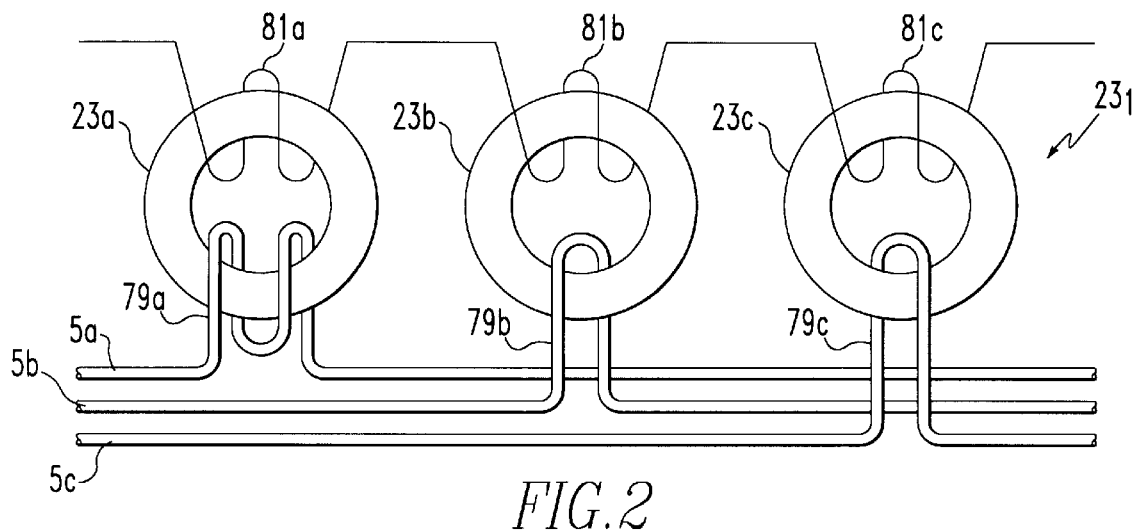
FIG. 2 is a schematic diagram of a current sensor in accordance with one embodiment of the invention.

FIG. 2 illustrates a current sensor 23₁ which includes three separate toroidal current transformers 23a–23c each of which has a primary winding 79a–79c and a secondary winding 81a–81c. Each of the transformers has a relative turns ratio which establishes the selected linear combination of current components in the single sensed current signal generated. Thus, in the exemplary embodiment where the relationship is 2A+B−C, the transformer 23a has two turns on the primary winding 79a provided by the conductor 5a wound in what will be considered the forward direction. The transformer 25b has a primary winding with one turn of the conductor 5b in the forward direction, and the transformer 23c has one turn of the conductor 5c in the reverse direction for its primary winding 79c. Each of the secondary windings 81a–81c have the same number of turns and are connected in series. Alternatively, the primary winding 79c of transformer 23c can be wound in the forward direction and the secondary winding can be reverse wound, or more practically, just connected in reverse in series with the secondaries of the transformers 23a and 23c. Also alternatively, the primary windings 79a–79c can all have the same number of turns in the same direction and the selected relative turns ratio could be provided in the secondary windings, again either with one of the secondary windings reversed wound or connected in reverse with the other two secondary windings.

Figure 3:
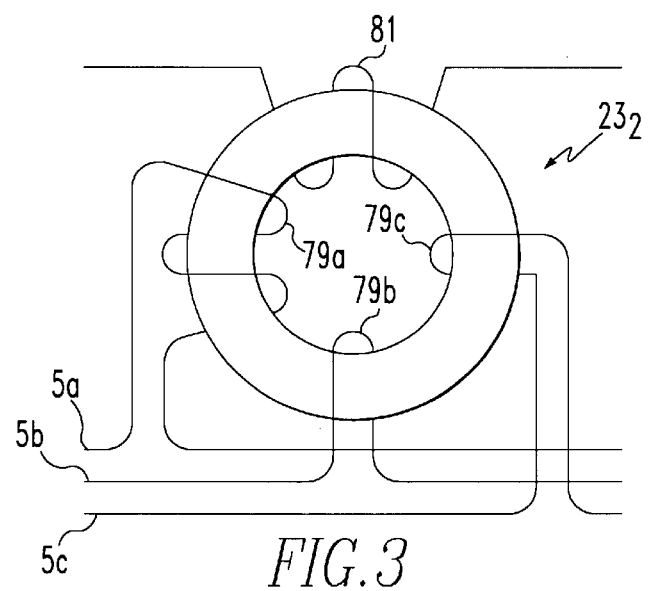
FIG. 3 is a schematic diagram of a current sensor in accordance with another embodiment of the invention.

FIG. 3 shows a current sensor 23₂ which comprises a single current transformer. This transformer has the three primary windings 79a–79c with the selected relative number of turns and the C primary wound in reverse, and a single secondary winding 81.

The single transformer current sensor of FIG. 3 is less expensive and requires less space. However, sets of three transformers housed in a single package are already available from other applications, and also provide separate phase current sensed signals which can be used for monitors which perform additional functions, such as those which monitor negative or zero sequence currents.

In operation, the monitor 9 provides indications of any faults detected in the motor and the severity of the condition. If all is well, the green light 73 is on. If nothing is shown on the display board 67 and the motor is running, either the line voltage is low or the fuse is blown. When the yellow light 71 is on but not flashing, this is an indication that one or two small arcing events in the motor have been detected within a selectable time period. In the exemplary monitor, this time period is one hour. If the time period has expired since the last small event (meaning that the current pulse had an amplitude above a first threshold), then the yellow light turns off. The monitor will remember how much of the time interval is left if it is turned off during a time period. This yellow light time-out period can be set in the exemplary system anywhere from 0.1 second to several hours, even days. If three or more small arcing events were detected during the selected interval, the yellow light 71 will flash. This flashing state of the yellow light 71 will persist until the reset button 75 is pushed. The yellow light 71 indicates that the motor may be failing.

When the red light is on, the monitor has detected one or two large arcing events (the pulses exceed a second higher threshold) in the motor 1. There is also a built-in trip curve 83 (see FIG. 4) which implements a time attenuated accumulation of the pulses. Thus, a number of small, "yellow", events detected in a short enough amount of time will cause an "accumulated trip" which counts as a large arcing event. When the red light 69 is flashing, three or more large arcing events or accumulated trips have been registered. Steady illumination of the red light 69 indicates that the motor may fail soon. A flashing red light means that the motor may fail sooner. The red light 69, whether on or flashing, persists in that state until the reset button 75 is pushed.

Pushing of the reset button 75 when either the red light 69 or yellow light 71 is on or flashing clears fault memory and returns the lights to the green state. In addition, the digital readout 76 which records the number of resets will be incremented by one. Pushing the reset button 75 when only the green light 73 is on does nothing. Normally the two-digit readout in the display 85 shows the number of times the unit has been cleared by pushing the reset button. When an arcing event is detected, the readout will display "yO", "rO", or "AO" for one second, depending on whether the event was small, large, or an accumulated trip. Then the number of resets returns to the display 76. The reset count can be cleared by use of a shorting jumper J2 (not shown) while the monitor is in a normal operation mode.

Figure 4:
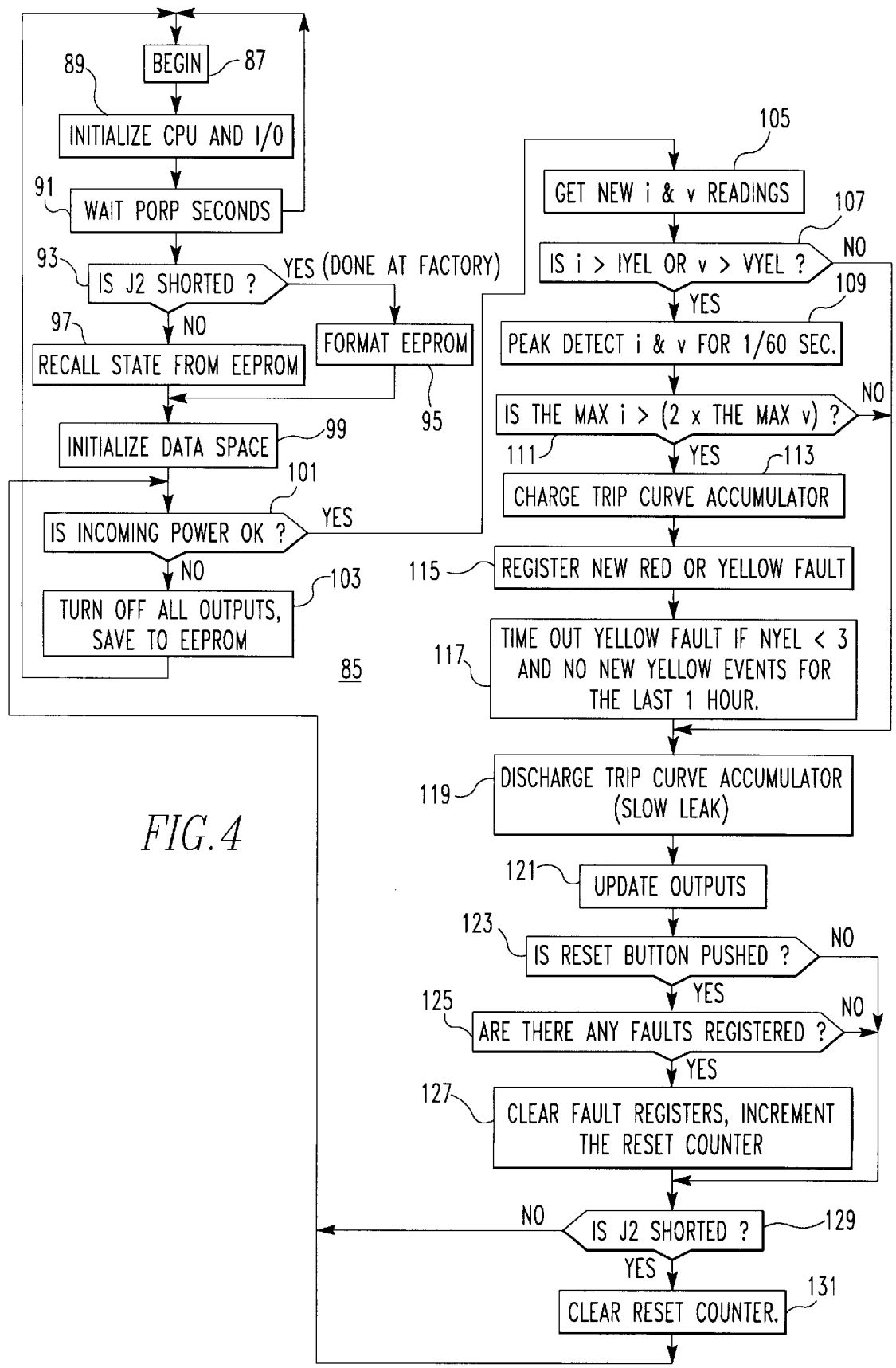
FIG. 4 is a flow chart of the software utilized by a microcontroller which is incorporated in the apparatus in accordance with a preferred embodiment of the invention.

The flowchart 85 for the software routine by which the microcontroller 41 implements the above functions is illustrated in FIG. 4. As shown, when the unit is turned on at 87 the central processing unit of the microcontroller and the input/output are initialized at 89. The routine then waits for a power-on reset period, PORP, which is about one to four seconds, as shown at 91. During this power-on reset period, the low voltage detector 65 is continuously polled. To proceed to 93, the output from the low voltage detector must indicate that the ac supply voltage is greater than the detector's threshold for the entire power-on reset period.

If the jumper J2 is in place at 93 then the EEPROM (memory) is formatted at 95. If this initialization is not performed the monitor will forget its state when turned off. After initialization at the factory, the last state of the monitor is recalled at 97 during startup. Thus for instance, the number of yellow faults and the time period remaining in the yellow interval are reestablished when monitor 9 and motor 1 are reenergized after having been turned off. Following initialization of the data space at 99, a check is made of the low voltage detector 65 at 101. If the voltage is below the threshold, the outputs are turned off and the states are saved to the EEPROM at 103 and then the monitor waits until the three-phase supply voltages return to levels above the minimum threshold.

When everything is normal, the microcontroller enters a loop in which it gets the current and voltage readings at 105 from the peak detectors 43 and 63. If either the current or voltage pulse signal is at least above its respective yellow threshold, as determined at 107, then the peak current and voltage pulse readings over a cycle are established by the software at 109. A determination is then made at 111 whether the detected event is upstream or downstream. This test is dependent upon the source line impedance being much less than the motor impedance. In other words, that the supply voltage is sufficiently "stiff", which is a reasonable assumption in virtually all cases. If the current to voltage ratio exceeds the exemplary reference value 2 at 111, then the event is downstream, i.e., originates in the motor. Fault events occurring in the motor charge the trip curve accumulator at 113. A register for the appropriate red or yellow fault light, depending on the magnitude of the pulse signal, is set at 115. The time remaining on the yellow light time-out timer is then checked at 117. If the count of yellow faults is less than the selected number, i.e., three, and no new yellow event has occurred during the selected time interval, the trip curve accumulator is decremented at 119 as appropriate. The routine also jumps to this point if the current pulse signal was not above the yellow minimum at 107 or the fault was not downstream as determined at 111.

Following discharge of the trip curve accumulator 119, the outputs, i.e., the lights and the display, are updated at 121. If the reset button is pressed at 123 and faults are registered at 125, the fault registers are cleared at 127 and the reset counter is incremented. Then, if the reset button 75 is not pushed or there are no faults registered, a check is made to see if the J2 jumper is installed at 129. If it is, the reset counter is cleared at 131.

Figure 5:
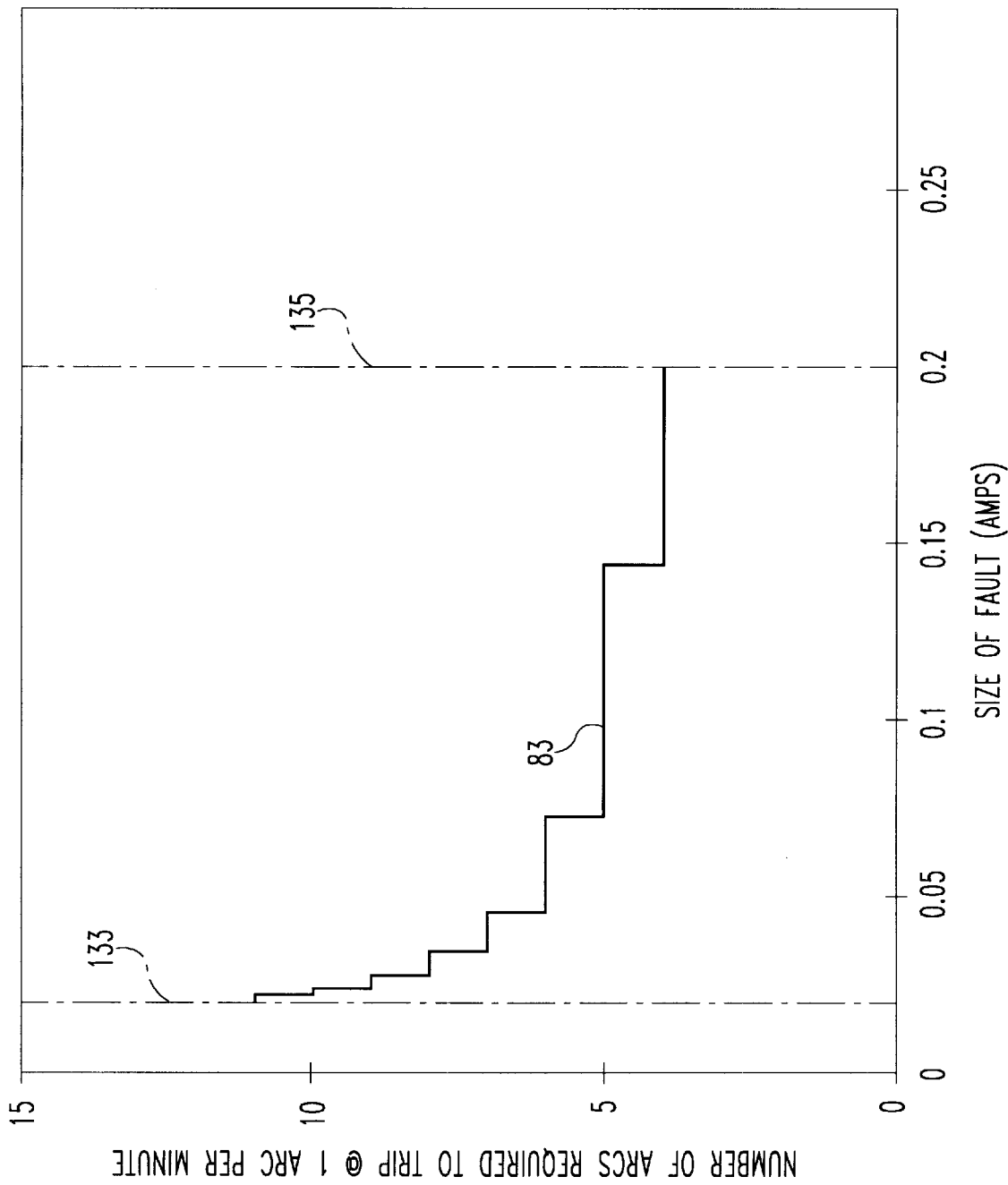
FIG. 5 is a trip curve illustrating the response of the apparatus.

The accumulated trip curve is shown in FIG. 5. This trip curve 83 determine the number of arcing events (pulses) required at a repetition rate of one per minute for arc events of a given amplitude to generate an accumulated trip. As can be seen, the pulses must have an amplitude which exceeds the yellow threshold 133 in order to be accumulated at all. A pulse which exceeds the red threshold 135 will cause an immediate red trip. A pulse which exceeds the yellow threshold will cause an immediate yellow trip. The accumulated trip value is time attenuated by a discharge trip curve (not shown) implemented in software which approximates an exponential decay. Thus, the trip accumulator is decremented as a function of the discharge trip curve so that widely separated events are not sufficient to generate an accumulated trip.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for on-line monitoring of a three-phase ac motor having a stator supplied through three phase conductors, said apparatus comprising:

sensing means comprising current sensing means coupled to each of said three phase conductors for generating a single sensed current signal containing components representative of currents in each of said three phase conductors weighted relatively so that algebraic differences between components from any two phase conductors are non-zero; and processing means generating an output indicative of stator electrical faults in said three-phase ac motor from said sensed current signal.

2. The apparatus of claim 1 wherein said current sensing means comprises transformer means having winding means which generate said single sensed current signal as a selected combination of said components representative of currents in each of said three phase conductors weighted relatively so that algebraic differences between components from any two phase conductors are non-zero.

3. The apparatus of claim 2 wherein said current sensing means comprises a single current transformer and said winding means comprises three primary windings, each connected to a different one of said three phase conductors with a respective number of turns of said three primary windings being selected to provide said selected linear combination of said current components in said sensed current signal, and a common secondary winding at which said sensed current signal is produced.

4. The apparatus of claim 3 wherein said single current transformer is an iron core transformer which produces said sensed current signal as a rate of change of current signal.

5. The apparatus of claim 4 wherein said processing means comprises first pulse discriminator means generating a pulse for each stator electrical fault event, and analyzer means generating an output which is a function of amplitude and frequency of occurrence of said pulses.

6. The apparatus of claim 3 wherein the respective number of turns of said three primary windings have relative values of +2, +1 and −1.

7. The apparatus of claim 3 wherein the respective number of turns of said three primary windings have relative values of +3, +2 and +1.

8. The apparatus of claim 2 wherein said transformer means comprises three current transformers and said winding means comprises for each current transformer, a primary winding and a secondary winding having a respective turns ratio, and means connecting said secondary windings in series, said respective turns ratios being selected to provide said selected linear combination of components in said single sensed current signal produced by the series connected secondary windings.

9. The apparatus of claim 8 wherein said three current transformers are iron core transformers which produce current signals as a rate of change of current.

10. The apparatus of claim 9 wherein said processing means comprises first pulse discriminator means generating a pulse for each stator electrical fault event, and analyzer means generating an output which is a function of amplitude and frequency of occurrence of said pulses.

11. The apparatus of claim 8 wherein said respective turns ratios are selected such that said selected linear combination of current components have relative values of +2, +1 and −1.

12. The apparatus of claim 8 wherein said respective turns ratios are selected such that said selected linear combination of current components have relative values of +3, +2 and +1.

13. The apparatus of claim 1 wherein said sensing means further includes voltage sensing means coupled to each of said three-phase conductors for generating a single sensed voltage signal containing components representative of voltage in each of said three phase conductors weighted relatively so that algebraic differences between components from any two phase conductors are non-zero, and wherein said processing means comprises means identifying stator electrical fault events from said sensed current signal and said sensed voltage signal and wherein said means generating said output indicative of stator electrical fault events only generates said output in response to sensed current and voltage signals coming from said three-phase ac motor.

14. The apparatus of claim 13 wherein said current sensing means comprises transformer means generating a rate of change of current signal and said processing means comprises first pulse discriminator means for generating a first pulse for each stator electrical fault event from said sensed current signal and second pulse discriminator means generating a second pulse for each stator electrical fault event from said sensed voltage signal, and analyzer means identifying electric arc fault events coming from said ac motor from said first pulse signal and second pulse signal and means generating said output only for pulse signals generated by stator electrical fault events.

15. The apparatus of claim 14 wherein said analyzer comprises a microcontroller and first and second peak detectors to which said first and second pulse signals, respectively, are applied for input to said microcontroller.

16. The apparatus of claim 1 wherein said processing means comprises pulse discriminator means generating a pulse for each stator electrical fault event, and analyzer means generating an output which is a function of amplitude and frequency of occurrence of said pulses.

17. The apparatus of claim 16 wherein said analyzer includes means generating said output in response to a predetermined time attenuated accumulation of said pulses.

18. The apparatus of claim 17 wherein said analyzer includes reset means for clearing said output, and means recording the number of times said reset means is actuated.

19. The apparatus of claim 1 adapted for use with an ac motor having a disconnect connected in said three phase conductors in proximity to said ac motor, wherein said sensing means is coupled to said three phase conductors between said disconnect switch and said ac motor.

20. The apparatus of claim 19 wherein said sensing means and processing means are mounted in a common housing with said disconnect.

\* \* \* \* \*